United States Patent [19]
Yamamoto et al.

[11] Patent Number: 6,065,772
[45] Date of Patent: May 23, 2000

[54] SIDE IMPACT AIR BAG SYSTEM

[75] Inventors: Ryosuke Yamamoto, Nagoya; Mikiharu Shimoda, Okazaki; Tsutomu Ookochi, Okazaki; Kazuya Miwa, Okazaki; Noritaka Nagayama, Okazaki; Junichi Nakamura, Anjo, all of Japan

[73] Assignee: Mitsubushi Jidosha Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/935,081

[22] Filed: Sep. 26, 1997

[30] Foreign Application Priority Data

Sep. 26, 1996 [JP] Japan .................................. 8-254859
Feb. 10, 1997 [JP] Japan .................................. 9-026445

[51] Int. Cl.⁷ .................................................. B60R 21/22
[52] U.S. Cl. ...................................... 280/730.2; 280/743.1
[58] Field of Search .............................. 280/730.1, 730.2, 280/743.1

[56] References Cited

U.S. PATENT DOCUMENTS 5,524,924  6/1996  Steffens, Jr. et al. .
5,556,128  9/1996  Sinnhuber et al. ................. 280/730.2
5,586,782  12/1996  Zimmerman et al. .............. 280/730.2
5,692,774  12/1997  Acker et al. ........................ 280/730.2
5,718,450  2/1998  Hurford et al. .................... 280/730.02
5,791,685  8/1998  Lachat et al. ....................... 280/730.2
5,803,485  9/1998  Acker et al. ........................ 280/730.2

FOREIGN PATENT DOCUMENTS 0714818      6/1996  European Pat. Off. .
3818185      8/1989  Germany .
4430412 C1  10/1995  Germany .
19517764    11/1996  Germany .
6227348      8/1994  Japan .
867228       3/1996  Japan .
WO9701461    1/1997  WIPO .

*Primary Examiner*—Paul N. Dickson

[57] ABSTRACT

An air bag system having an air bag module 20 including an inflator 22 and an air bag 25 is installed in a seat back 12. When a side collision occurs against a vehicle, the air bag 25 is inflated between a passenger and an inner wall of a vehicle compartment. The air bag 25 has a separator 27 for vertically separating the inside of the air bag 25 into first and second chambers 28 and 29. The separator 27 is extended along a vehicle front-to-rear direction, and defines a communication portion 27a at a vehicle rear side in the air bag 25 for interconnecting the two chambers 28 and 29 and guiding gas blown by the inflator 22 from the first chamber 28 to the second chamber 29.

24 Claims, 13 Drawing Sheets

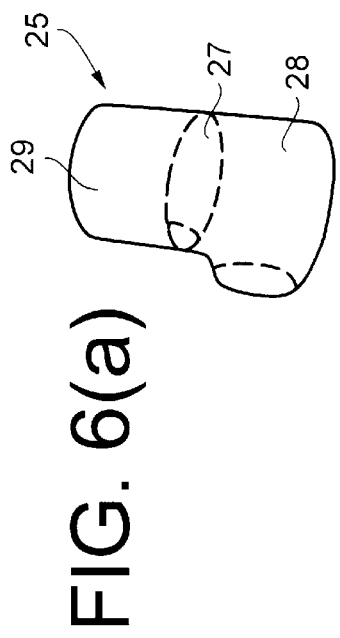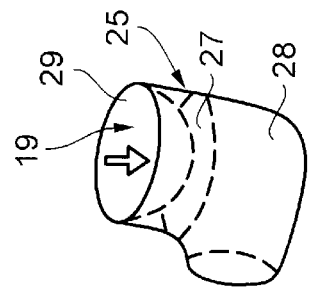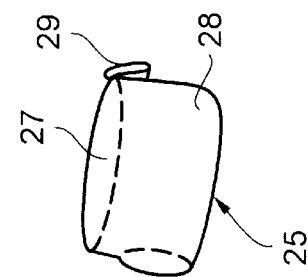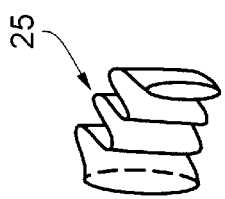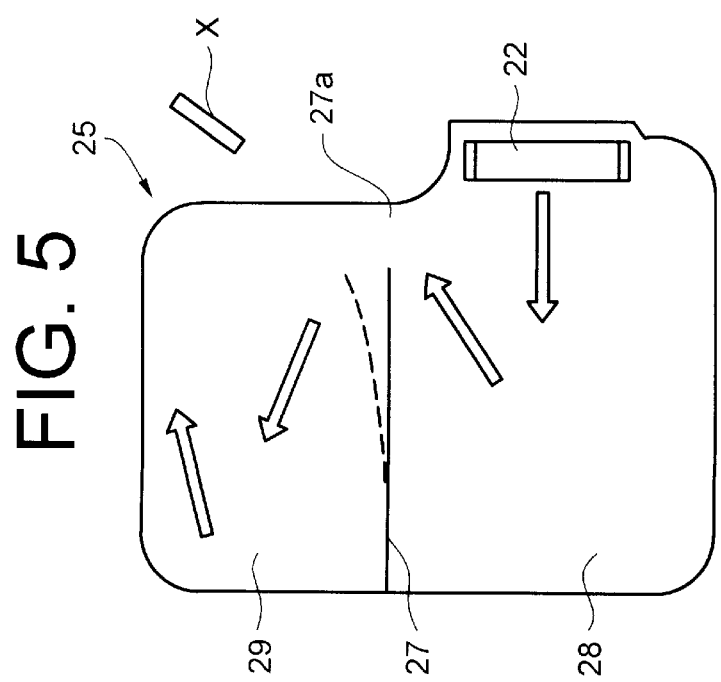

SIDE IMPACT AIR BAG SYSTEM

BACKGROUND OF THE INVENTION

1. Field of the Invention

The present invention relates to a side impact air bag system which is inflated between a driver or a passenger seated in a vehicle and an inner wall of a vehicle compartment for absorbing a collision energy when a collision impact is applied externally to a side of the vehicle.

2. Prior Art

In a practically used vehicle air bag system, an air bag is built in a steering wheel at a driver's seat side or an instrument panel at a passenger's seat side. If a collision occurs against a front end of a vehicle, the air bag is momentarily inflated for absorbing a forward inertial force applied to a passenger (including a driver), thereby preventing a secondary collision of the passenger against the steering wheel, the instrument panel or the like. Further, a side impact air bag system is developed in which an air bag is built in an inner wall of a vehicle compartment, an inner wall of a door, a seat back or the like. When a collision occurs against a side of the vehicle, the air bag is momentarily inflated for preventing a secondary collision of an upper half of body the passenger against the inner wall of the door or the like.

When a collision force is applied externally to a side of the vehicle, a collided side wall of the vehicle is moved toward a center of the vehicle compartment at an opposite side with respect to the point of collision, and a seat cushion is moved via a side sill and a floor to the center of the vehicle compartment. Since the passenger is not fixed to the seat cushion, the passenger tends to stay due to inertia. Therefore, there is a possibility of the secondary collision between the inner wall of the vehicle compartment moving toward the center and the upper half body of the passenger. The aforementioned side impact air bag system is for the safety of the passenger in case of such vehicle side collision.

FIGS. 13(a) and 13(b) show a seat mounted side air bag system. In FIGS. 13(a) and 13(b), seat S has a seat cushion 1 and a seat back 2. Inside a side support 3 at a door side of the seat back 2, an air bag module 7 including an inflator 5 and an air bag 6, disposed behind a cushion pad 4, are contained. A portion where the air bag 6 is inflated from the air bag module 7 is covered with the cushion pad 4. Further, a covering 8 for covering a surface of the seat back 2 has a front cover 8a and a side cover 8b sewn or closed together at corners with a seam 8c.

When an impact applied to the side of the vehicle is detected by a sensor (not shown) for detecting an impact resulting from a side collision against the vehicle, an operation command is transmitted to the inflator 5, and rare gas or another inflating gas is momentarily blown from the inflator 5 into the air bag 6. The air bag 6 is inflated to tear the cushion pad 4 and the seam 8c and deployed outwardly.

As shown in FIGS. 14 and 15, the air bag 6 is divided by a partition 9 into a lower chamber 6a and an upper chamber 6b. The partition 9 is provided with a vent or a communication hole 9a. Gas blown from the inflator 5 first flows directly into the lower chamber 6a, and successively via the communication hole 9a into the upper chamber 6b. Therefore, the lower chamber 6a of the air bag 6 is inflated between a torso 10a of a passenger 10 and an inner wall of a vehicle compartment, and the upper chamber 6b is successively inflated between a head 10b of the passenger 10 and the inner wall of the vehicle compartment, thereby protecting the upper half of the passenger 10 (the torso 10a and the head 10b) from a secondary collision against the inner wall of the vehicle compartment. The air bag system having the aforementioned constitution is disclosed, for example, in the publications of Japanese Patent Application laid-open Nos. Hei 06-227348, 08-067228 and the like.

In the seat mounted side air bag device shown in FIG. 13, the air bag 6 is divided by the partition 9 into the lower chamber 6a and the upper chamber 6b. Gas blown from the inflator 5 flows directly into the lower chamber 6a, and successively via the communication hole 9a into the upper chamber 6b. The lower chamber 6a of the air bag 6 is deployed between the torso 10a of the passenger 10 and the inner wall of the vehicle compartment, and successively the upper chamber 6b is deployed between the head 10b of the passenger 10 and the inner wall of the vehicle compartment.

In this case, when inflating gas flows via the communication hole 9a into the upper chamber 6b to inflate the upper chamber 6b, as shown in FIG. 16(a), the upper chamber 6b interferes with a seat belt X. As a result, as shown by a dotted line in FIG. 16(a), a cavity a is formed in the upper chamber 6b and the upper chamber 6b is disadvantageously obstructed by the seat belt X from being completely inflated.

In another constitution shown in FIG. 16(b), the communication hole 9a is provided in a vehicle front side of the partition 9 of the air bag 6. The gas blown from the inflator 5 is reflected by a point b on an inner wall of the air bag 6, so that the gas flows toward a vehicle rear side of the upper chamber 6b. Even in this constitution, when the upper chamber 6b is inflated toward the vehicle rear side of the seat belt X, the upper chamber 6b also interferes with the seat belt X. As shown by a dotted line, a cavity c is formed in the vehicle front side of the upper chamber 6b, and the upper chamber 6b is obstructed by the seat belt X from being completely inflated.

In either of the aforementioned constitutions, the upper chamber 6b of the air bag 6 is obstructed from being completely deployed between the head of the passenger and the inner wall of the vehicle compartment, and a collision energy applied to the head is disadvantageously difficult to be sufficiently absorbed.

SUMMARY OF THE INVENTION

Wherefore, an object of the present invention is to provide a side impact air bag system which can sufficiently absorb a collision energy on a passenger's torso and head with an air bag when an impact is applied externally to a side of a vehicle, and can securely and safely protect a passenger seated in the vehicle.

To achieve this and other objects, the invention provides a side impact air bag system having a gas generating device attached to a vehicle seat and a bag connected to the gas generating device. The gas generating device blows gas toward a vehicle front side when a collision force applied to a side of a vehicle is detected, and the bag is deployed by the gas. The bag includes a first chamber positioned between a passenger's torso and a vehicle side part when deployed, and a second chamber positioned between a passenger's head and the vehicle side part when deployed. The gas blown from the gas generating device directly flows into the first chamber to deploy the first chamber, and flows via the first chamber into the second chamber to deploy the second chamber. The bag also includes a first separator extending along a front-to-rear direction of the vehicle for separating the bag into the first chamber and the second chamber, and a first communication portion formed in a vehicle rear side of the first separator for connecting the first chamber and the second chamber. The gas blown from the gas generating device to the vehicle front side is deflected to the first communication portion by an inner surface of the vehicle front side of the first chamber, and is deflected to the vehicle front side in the second chamber by an inner surface of the vehicle rear side of the first communication portion when passing the first communication portion.

In the side impact air bag system, the gas flowing into the second chamber is further deflected to a vehicle rear upper part of the second chamber by an inner wall of the vehicle front side of the second chamber.

In the side impact air bag system, the first separator is a partitioning wall or a seam.

Further in the side impact air bag system, the bag includes a third chamber provided on the vehicle rear upper part of the second chamber.

The bag also includes a second separator for separating the second chamber from the third chamber.

The bag further includes a second communication portion formed on the vehicle front side of the second separator for connecting the second chamber and the third chamber.

In the side impact air bag system, the second separator is a seam.

The seam has a strength at the side of the second communication portion set lower than the strength at the vehicle rear side.

Also, the strength of the second separator is set lower than the strength of the first separator.

Further, the strength of the second separator is set such that the second separator is broken when the second chamber is deployed.

Also in the side impact air bag system, the first separator and the second separator are seams.

BRIEF DESCRIPTION OF THE DRAWINGS

FIG. 5 is a longitudinal sectional side view of an air bag according to the first embodiment.

FIGS. 6(*a*), 6(*b*), 6(*c*), and 6(*d*) are perspetive views of the air bag showing a sequence of folding up the air bag according the first embodiment.

FIG. 13(*a*) is a perspective view of the seat and FIG. 13(*b*) is a cross-sectional view taken along a line XIIIB—XIIIB in FIG. 13(*a*).

DESCRIPTION OF THE PREFERRED EMBODIMENTS

Embodiments of the present invention are now described by referring to the accompanying drawings.

First Embodiment

Figure 1:
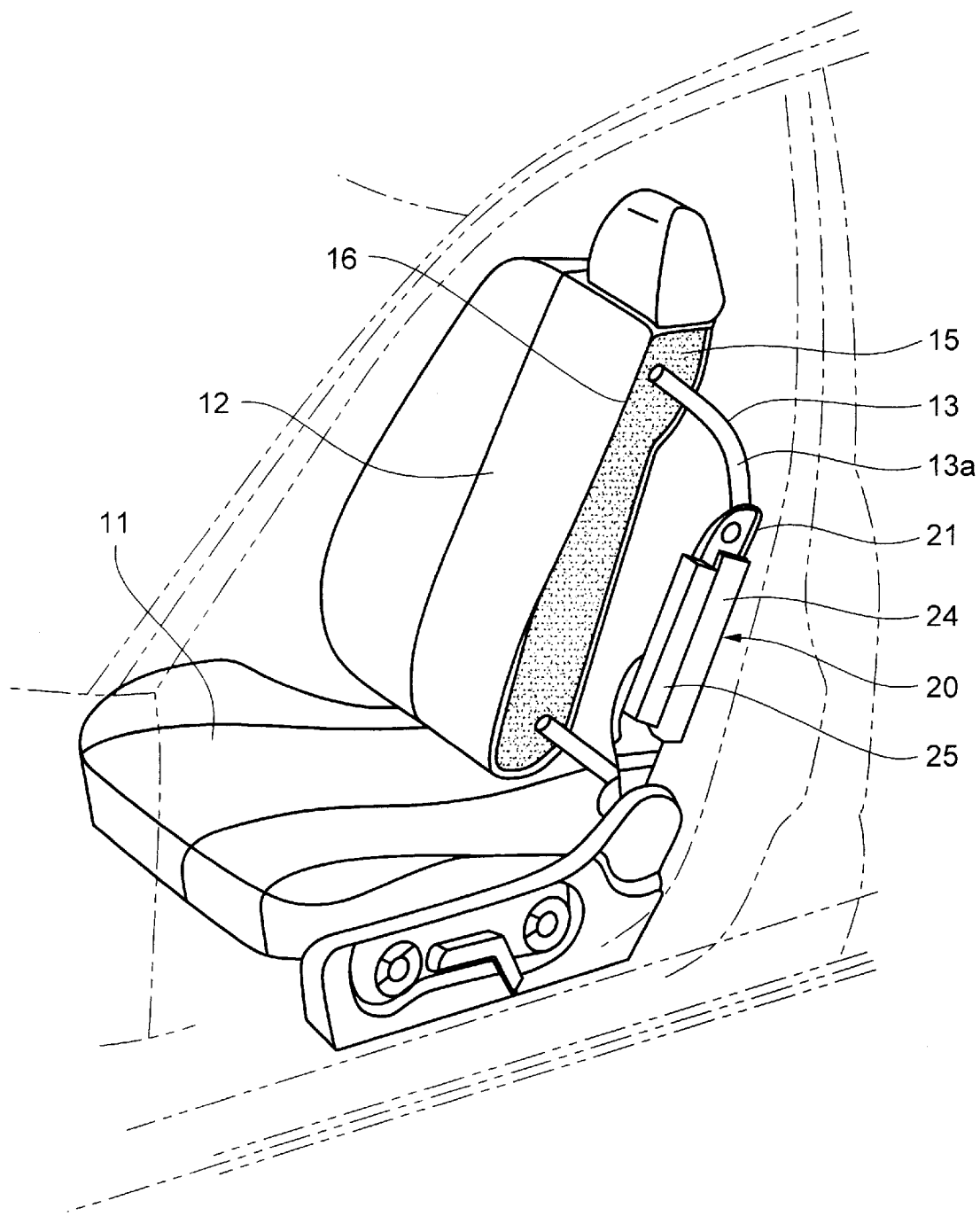
FIG. 1 is a partly cutaway perspective view of a seat having a side impact air bag system built therein according to a first embodiment of the present invention.

FIGS. 1–8 show a first embodiment. FIG. 1 shows a passenger side seat including a seat cushion 11 and a seat back 12. The seat back 12 is mainly constituted of a seat frame 13, a cushion material 15 attached together with a spring 14 to the seat frame 13, and a first cover member 16 for covering these components. The first cover member 16 is formed of, for example, leather, cloth, synthetic resin sheet or the like.

Figure 2:
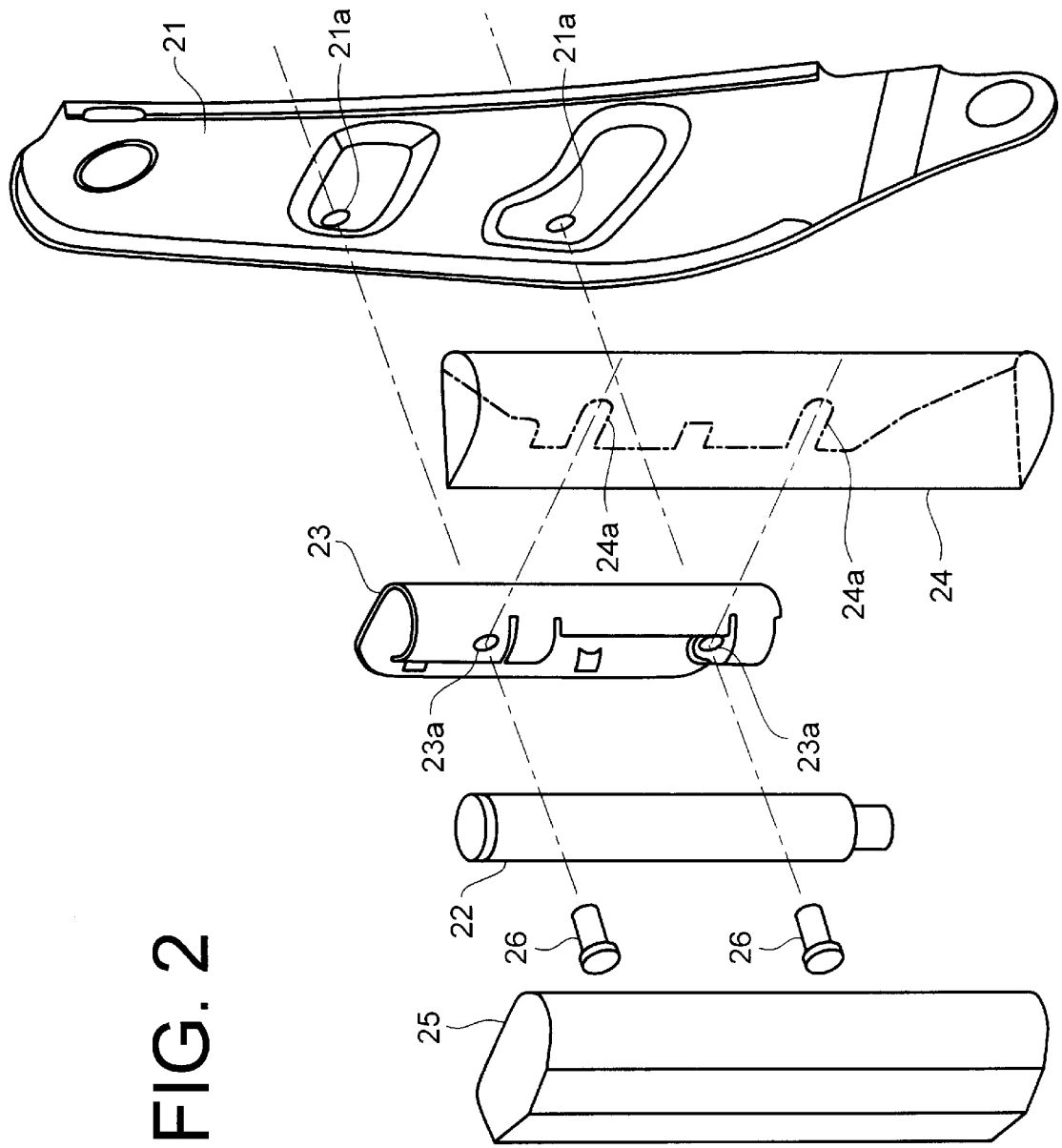
FIG. 2 is an exploded perspective view of an air bag module.
Figure 3:
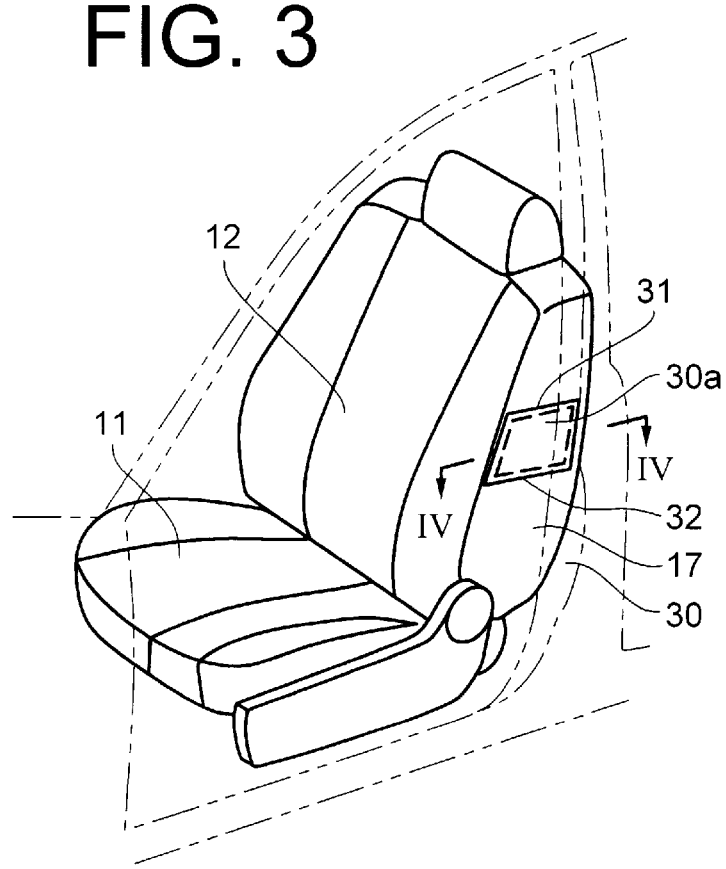
FIG. 3 is a perspective view of a seat having a side impact air bag system built therein.
Figure 4:
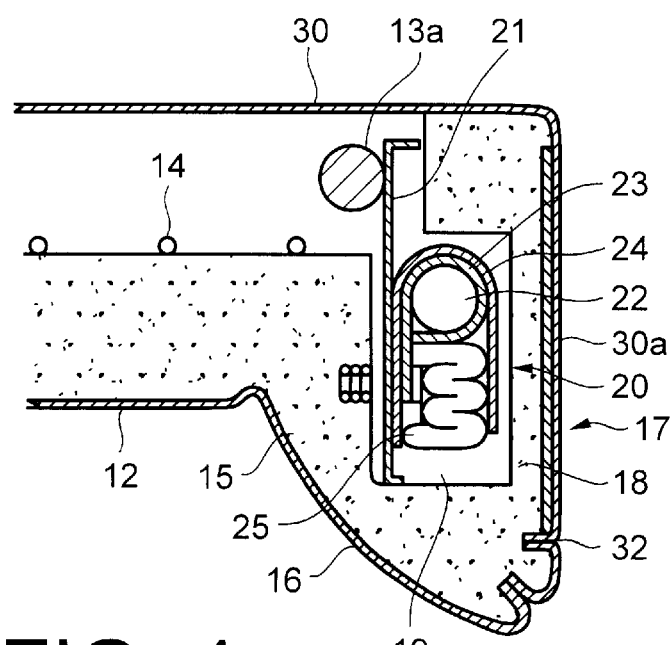
FIG. 4 is a cross-sectional view taken along a line IV—IV in FIG. 3.

As shown in FIGS. 2–4, an opening 18 is provided in a side wall 17 of the seat back 12, specifically in a substantially vertical center of the side wall 17 opposing a vehicle door (not shown), more specifically in a portion corresponding to an abdomen of a passenger when seated on the seat cushion 11. A recess 19, surrounded with the cushion material 15 and facing the side wall 17, is formed inside the seat back 12 at a portion opposing the opening 18.

An air bag module 20 is installed inside the recess 19. At the side adjacent the seat frame 13, the air bag module 20 has a base 21 of sheet metal fixed vertically along a frame member 13*a* extending vertically. The base 21 is provided with two attachment bores 21*a* vertically spaced apart from each other.

The base 21 has, in its front side, a retainer 23 for retaining an inflator 22 for generating nitrogen gas or the like and an outer case 24 for covering the retainer 23. The retainer 23 and the outer case 24 are provided with bolt insertion portions 23*a* and 24*a* to be aligned with the attachment bores 21*a* of the base 21, respectively.

The air bag module is attached to the seat frame 13 by inserting attachment bolts 26 through the bolt insertion portions 23*a* and 24*a* and threading into the attachment bores 21*a*, while interposing a proximal end of a compressed and folded air bag 25 between the retainer 23 and the outer case 24. Therefore, the air bag 25 is attached to the base 21, opposing the front side of the opening 18 and obliquely facing the front side of the vehicle.

The inside of the air bag 25 is, as shown in FIG. 5, divided by a partition 27 into a lower chamber 28 as a first chamber and an upper chamber 29 as a second chamber. Inside the air bag 25, the partition 27 extends along a direction from the a vehicle front side toward a vehicle rear side. In the vehicle rear side, a communicating hole 27*a* is provided for connecting the lower chamber 28 and the upper chamber 29. The gas blown via a vent hole formed in the lower part of the inflator 22 flows directly into the lower chamber 28, and successively flows via the communication hole 27*a* into the upper chamber 29.

Specifically, gas is blown from the inflator 22 toward the vehicle front side of the lower chamber 28, then reflected by an inner surface at the vehicle front side of the lower chamber 28, and directed toward the vehicle rear side of the lower chamber 28, to inflate and deploy the lower chamber 28. Upon completion of inflation and deployment of the lower chamber 28, gas is introduced via the communication hole 27a into the upper chamber 29. Since the momentum of the gas flows towards the vehicle rear side before passing the communication hole 27a, the gas is reflected by an inner surface of the air bag 25 in the vicinity of the communication hole 27a and urged to flow toward the vehicle front side upon passing the communication hole 27a. Therefore, the gas flows into the vehicle front side of the upper chamber 29 while passing the communication hole 27a. The upper chamber 29 of the air bag 25 is inflated in front of the seat belt X fastened on the passenger without being obstructed by the seat belt.

Additionally, the partition 27 is positioned substantially opposing a passenger's shoulder. The lower chamber 28 of the air bag 25 intervenes between the torso of the passenger and the inner wall of the vehicle compartment, and the upper chamber 29 successively intervenes between the head of the passenger and the inner wall of the vehicle compartment, thereby avoiding the secondary collision between the upper half (the torso and the head) of the passenger and the inner wall.

As shown in FIGS. 6(a)–6(d), the air bag 25 is folded and placed in the recess 19. FIG. 6(a) shows an unfolded condition of the air bag 25. As shown in FIG. 6(b), the air bag 25 is folded inwardly by collapsing inwardly the upper part of the upper chamber 29 of the air bag 25. Subsequently, as shown in FIG. 6(c), the air bag 25 is folded into two around the partition 27 and made flat. Finally, as shown in FIG. 6(d), the air bag 25 is folded in a front-to-rear direction into a compact shape of a bellows.

A second cover member 30 for covering the rear side of the seat back 12 is formed of the same material as that of the first cover member 16. A cover piece 30a is formed on a part of the second cover member 30 for covering the opening 18. The periphery of the cover piece 30a is sewn using a sewing thread 31 onto an edge defining the opening 18 of the first cover member 16. A tear strength of sewn portion 32 of the cover piece 30a with respect to the first cover member 16 is lower than the sewing strength of the first cover member 16 partly constituting the seat back 12. To reduce the tear strength or sewing strength, a feeble or thin sewing thread 31 is used or a sewing pitch is increased. When nitrogen gas or the like is blown into the air bag 25 to inflate the air bag 25, the sewn portion 32 is torn under the pressure of the gas, thereby deploying the air bag 25.

Further, the sewing strength of the sewn portion 32 is not constant along the entire length of the cover piece 30a. The sewing strength of the sewn portion 32 is decreased from the vehicle rear side toward the vehicle front side. Specifically, the vehicle front side of the cover piece 30a is the weakest. When the air bag 25 is inflated, the vehicle front side, i.e. the seated passenger's side of the sewn portion 32 of the cover piece 30a is first torn. Therefore, while advancing toward the vehicle front side, the air bag 25 is deployed between the passenger and the inner wall of the vehicle compartment, thereby securing the safety of the passenger.

Operation of the air bag system having the aforementioned constitution is now described.

When a collision force is applied to the side of the vehicle, the collision force is detected by the sensor (not shown), which transmits an operation command to the inflator 22. Accordingly, inflating gas is momentarily blown from the inflator 22 to the lower chamber 28 of the air bag 25, to inflate the lower chamber 28 of the air bag 25. The cover piece 30a is pushed outwardly under a pressure resulting from inflation of the lower chamber 28. The sewn portion 32, weakened as compared with the first cover member 16 partly constituting the seat back 12, starts tearing, and separates from the first cover member 16, thereby uncovering the opening 18. Therefore, the lower part of the air bag 25 is deployed between the torso of the seated passenger and the inner wall of the vehicle compartment.

Specifically, as shown in FIG. 5, the gas blown from the inflator 22 to the lower chamber 28 inflates and deploys the lower chamber 28. After the lower chamber 28 is substantially completely deployed, the gas is introduced along the partition 27 into the communication hole 27a. When passing the communication hole 27a, the gas is reflected by the inner surface of the air bag 25 and flows towards the vehicle front side. The upper chamber 29 of the air bag 25 is inflated by the gas entering the upper chamber 29 in front of the seat belt X fastened on the passenger, i.e. at the position not in contact with the seat belt X. The upper chamber 29 intervenes in a space between the head of the seated passenger and the inner wall of the vehicle compartment. Therefore, when the upper chamber 29 of the air bag 25 is deployed, the upper chamber 29 can be securely prevented from being obstructed by the seat belt X. The secondary collision of the head of the passenger against the inner wall of the vehicle compartment is thus prevented.

Figure 7A:
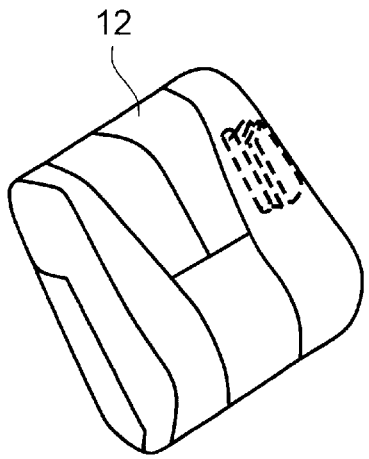
FIGS. 7(*a*), 7(*b*), 7(*c*) and 7(*d*) are perspective views of a seat back showing a process of inflating the air bag according to the first embodiment.
Figure 7B:
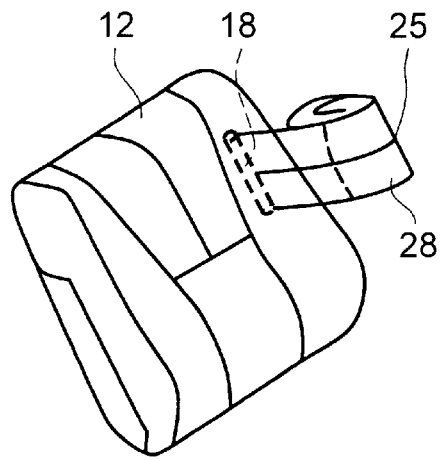
Figure 7C:
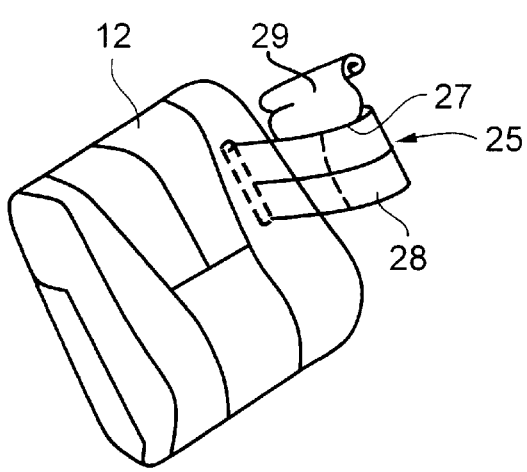
Figure 7D:
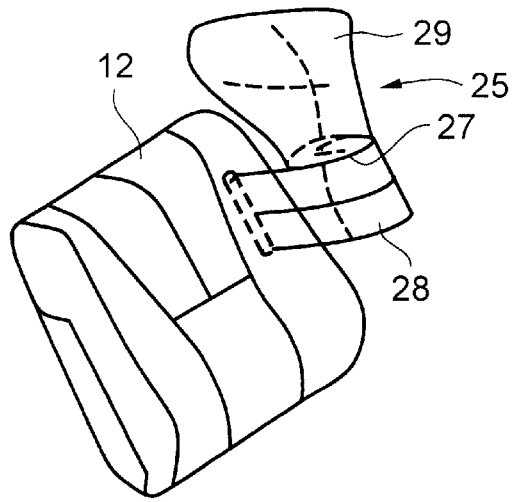

FIGS. 7(a)–7(d) show a process spanning the inflation process of the air bag 25 contained in the seat back 12. As shown in FIG. 7(b), the air bag 25 is exposed out of the opening 18. As shown in FIG. 7(c), the lower chamber 28 is first inflated, and the upper chamber 29 is successively inflated as shown in FIG. 7(d).

Figure 8A:
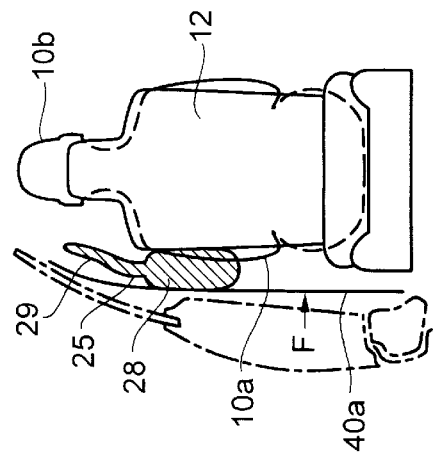
FIGS. 8(*a*), 8(*b*), (8*c*), 8(*d*) and 8(*e*) are rear views of a seat showing an operation of the side impact air bag system according to the first embodiment.
Figure 8B:
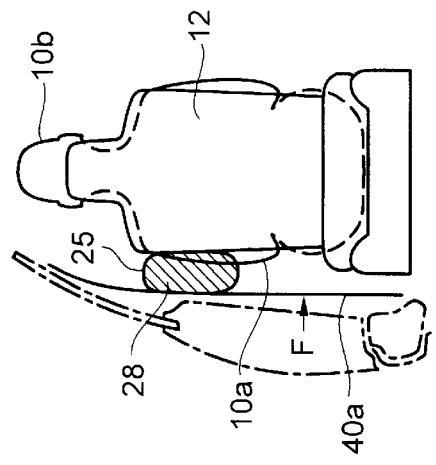
Figure 8C:
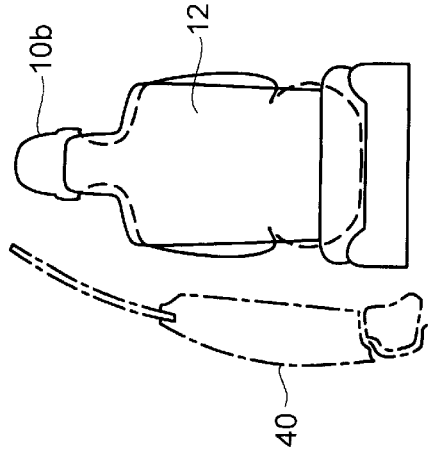

FIGS. 8(a)–8(e) show the condition of the vehicle receiving a collision force F from its side, as seen from behind the passenger's seat. FIG. 8(a) shows a normal condition, and FIG. 8(b) shows a condition when collision force F is applied to the side of the vehicle. In this condition, a vehicle side wall 40 is moved toward the center of the vehicle compartment in an opposite side with respect to the point of collision and stops at a position 40a shown by a solid line in FIG. 8(b). When the collision force F is applied to the vehicle side wall 40, the collision force F is detected by the sensor (not shown), which transmits an operation command to the inflator 22. Accordingly, gas is momentarily blown from the inflator 22 into the lower chamber 28 of the air bag 25, to inflate the lower chamber 28 of the air bag 25. As shown in FIG. 8(c), since the lower chamber 28 of the air bag 25 intervenes between the torso 10a of the passenger 10 and the vehicle side wall 40. Therefore, the secondary collision of the torso 10a of the passenger 10 against the vehicle side wall 40 can be prevented. A collision energy is absorbed by the lower chamber 28 of the air bag 25.

Figure 8D:
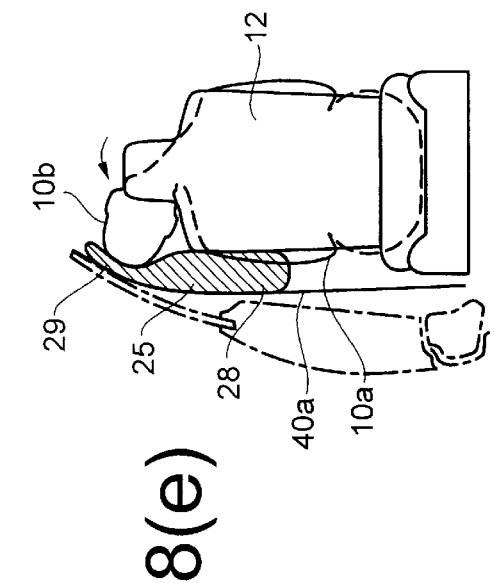
Figure 8E:
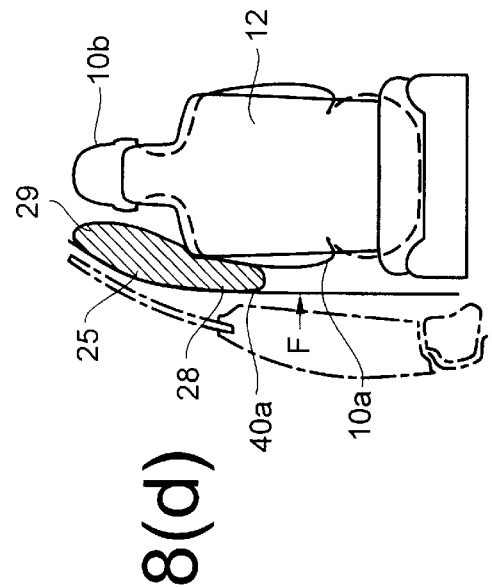

As shown in FIGS. 8(d) and (e), the seat cushion 11 is moved via the side sill and the floor toward the middle of the vehicle compartment, while the torso 10a of the passenger 10 seated on the seat cushion 11 is moved toward the center of the vehicle compartment via the lower chamber 28 by the vehicle side wall 40. In this case, since the head 10b of the passenger 10 is not fixed to the seat cushion 11, the head 10b tends to remain as it is due to inertia, and, as a result, moves closer to the vehicle side wall 40 moving toward the center of the vehicle compartment. However, after the lower chamber 28 is inflated, the upper chamber 29 is successively inflated in a space between the head 10b of the passenger 10 and the vehicle side wall 40. The secondary collision of the head 10b of the passenger 10 against the vehicle side wall 40 is also prevented. Further, the collision energy is absorbed by the upper chamber 29 of the air bag 25.

The relative displacement between the passenger 10 and the vehicle side wall 40 is caused by the impact resulting from the side collision. Specifically, the torso 10a of the passenger 10 comes closer to the vehicle side wall 40 and the head 10b successively comes closer to the vehicle side wall 40. However, since the lower chamber 28 and the upper chamber 29 of the air bag 25 are successively inflated, the secondary collision of the passenger 10 against the vehicle inner wall 40 can be prevented. Further, the provision of the communication hole 27a in the vehicle rear side of the air bag 25 can increase the primary pressure necessary for tearing the sewn portion 32 of the first and second cover members 16 and 30 of the seat back 12 when the air bag 25 is inflated. Further, the period of time necessary for inflating the lower chamber 28 can be effectively shortened.

Second Embodiment

A second embodiment is now described with reference to FIGS. 9–11. The second embodiment is different from the first embodiment in the configuration and inflated/deployed condition of the air bag. The different respects are described in the following.

Figure 9:
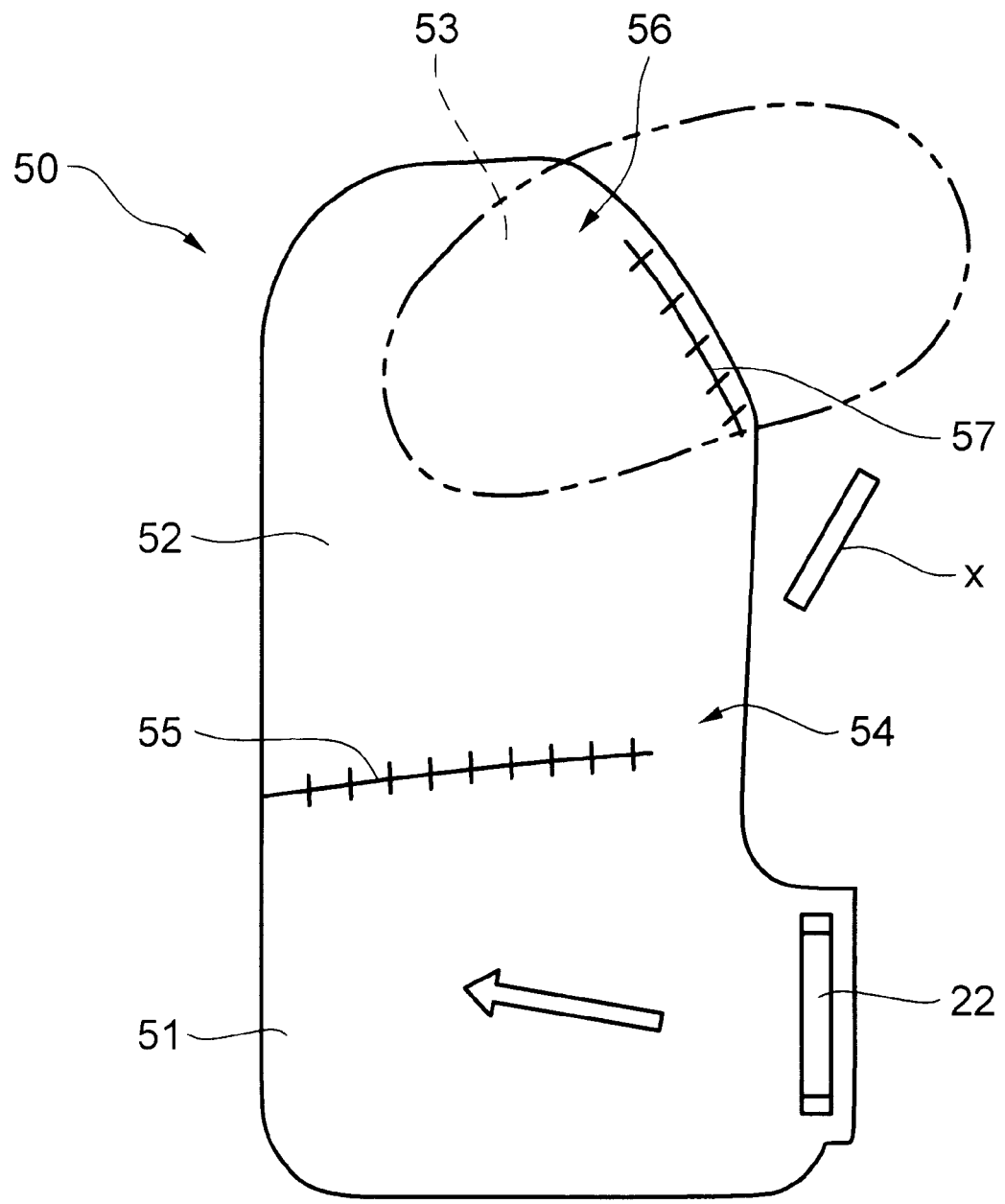
FIG. 9 is a longitudinal sectional side view of an air bag according to a second embodiment of the invention.

First, regarding the configuration of an air bag 50, FIG. 9 shows an extended condition of the air bag 50. As shown in FIG. 9, the inside of the air bag 50 is divided, vertically, as seen in the figure into three chambers: namely, a lower chamber 51 as a first chamber; an upper chamber 52 as a second chamber; and an upper rear chamber 53 as a third chamber. When the air bag 50 is inflated and deployed while a passenger is seated with a seat belt fastened, the lower chamber 51 is positioned at a height corresponding to the passenger's torso. Similarly, the upper chamber 52 is positioned corresponding to the passenger's torso and head, and the upper rear chamber 53 corresponding to a position covering the side of the passenger's head.

The inflator 22 having discharge ports in its lower portion is provided in the lower chamber 51. Gas is blown via the discharge ports to the vicinity of a bottom of the lower chamber 51. The upper rear chamber 53 is continuous from the upper chamber 52, i.e. a vehicle rear side of the air bag 50 is bent, so that the air bag 50 when inflated does not interfere with the seat belt X. The upper rear chamber 53 is folded and contained in the upper chamber 52 before inflated and deployed.

Between the lower chamber 51 and the upper chamber 52 of the air bag 50, a portion from the vehicle front side toward the vehicle rear side is sewn with a sewing thread to form a sewn portion or seam 55 as a first separator. The seam 55 extends to a not-sewn portion at the vehicle rear side. This not-sewn portion defines a first communication hole 54 for interconnecting the lower chamber 51 and the upper chamber 52. The seam 55 is positioned substantially opposing the passenger's shoulder. The sewing strength of the seam 55 is set such that the seam 55 resists tearing even when the pressure resulting from inflation of the air bag 50 is applied to the seam 55.

Between the lower chamber 52 and the upper rear chamber 53 of the air bag 50, a portion is sewn with a sewing thread from the vehicle rear side obliquely upwards, thus forming a sewn portion or tear seam 57 as a second separator. The tear seam 57 also extends to a not-sewn portion at the vehicle front side. This not-sewn portion defines a second communication hole 56 for interconnecting the upper chamber 52 and the upper rear chamber 53.

The upper chamber 52 and the upper rear chamber 53 are joined together by the tear seam 57 except the communication hole 56. The tear seam 57 is formed so weak that the tear seam 57 tears when the upper chamber 52 and a part of the upper rear chamber 53 are inflated and an internal pressure reaches a specified value. The sewing strength of the tear seam 57 is set such that the tear seam 57 is torn when the pressure resulting from inflation of the upper chamber 52 acts on the tear seam 57. The sewing strength is also adjusted such that the tear seam 57 can tear from the side of the communication hole 56. To adjust the sewing strength of the tear seam 57, an excessively weak sewing thread, a small-diameter thread or the like is used, or a sewing pitch is increased. The sewing strength of the tear seam 57 can be adjusted with either one of these measures.

Figure 10C:
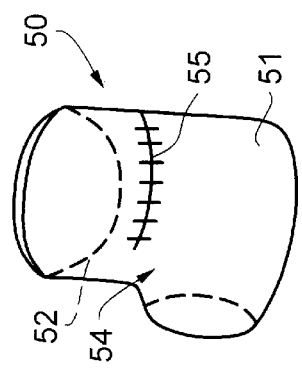
FIGS. 10(*a*), 10(*b*), 10(*c*), 10(*d*) and 10(*e*) are perspective views of the air bag showing a sequence of folding up the air bag according to the second embodiment.
Figure 10E:
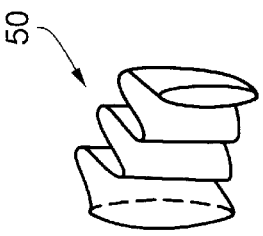
Figure 10B:
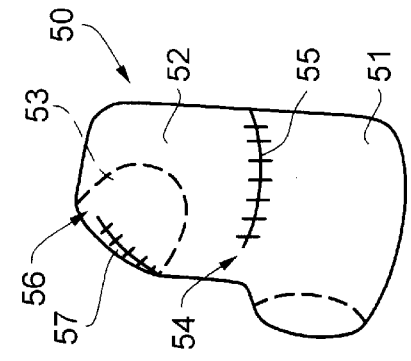
Figure 10D:
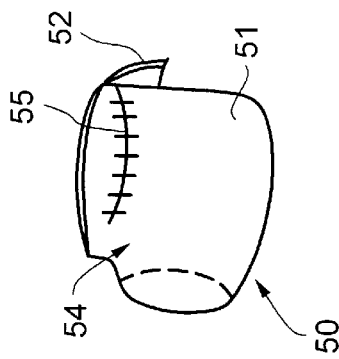
Figure 10A:
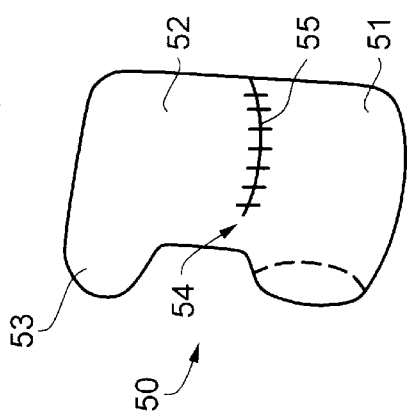

A process for folding the air bag 50 is described referring to FIGS. 10(a)–10(e). FIG. 10(a) shows an unfolded or extended condition of the air bag 50. As shown in FIG. 10(b), the upper rear chamber 53 of the air bag 50 is folded into the upper chamber 52. The upper chamber 52 and the upper rear chamber 53 are sewn together by the tear seam 57 except the communication hole 56. Subsequently, as shown in FIG. 10(c), the upper part of the upper chamber 52 is collapsed or folded in, and as shown in FIG. 10(d), the folded air bag 50 is further folded into two outwardly at the vicinity of the seam 55 towards the inner wall of the vehicle compartment, and made flat. Finally, as shown in FIG. 10(e), the air bag 50 is folded in a shape of a bellows in the front-to-rear direction of the vehicle.

The inflated and deployed condition of the air bag 50 is described. Since gas is momentarily blown from the inflator 22, the air bag 50 seems to be momentarily inflated completely. Here, the occurrence in a short time is detailed. A flow of gas G inside the air bag 50, as well as a sequence of inflating and deploying the air bag 50 are described referring to FIG. 11.

Figure 11A:
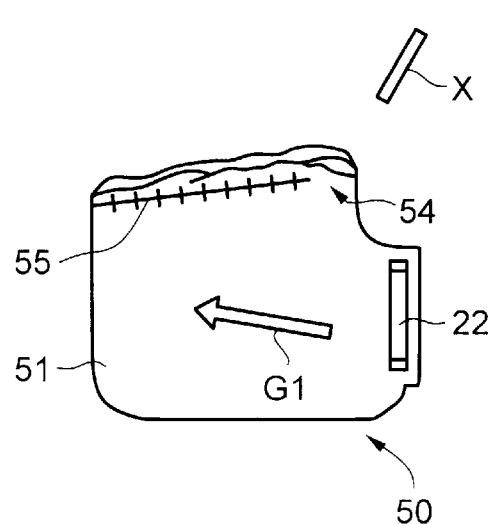
FIGS. 11(*a*), 11(*b*), and 11(*c*) are longitudinal sectional side view of the air bag showing a process of inflating the air bag according to the second embodiment.
Figure 12A:
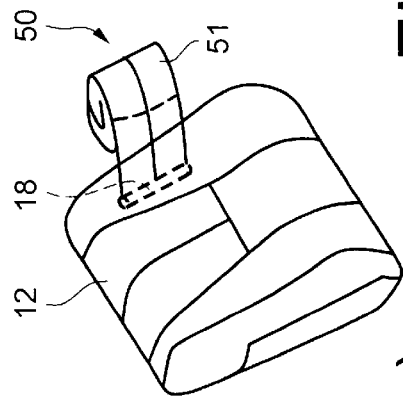
FIGS. 12 (*a*), 12(*b*), 12(*c*), 12(*d*) and 12(*e*) are perspective views of a seat back showing a process of inflating the air bag according to the second embodiment.
Figure 12B:
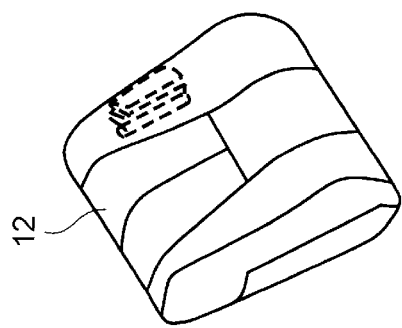

When a collision force is applied to the side of the vehicle, the sensor (not shown) detects the collision force and transmits an operation command to the inflator 22. As shown in FIG. 11(a) and FIG. 12(b), the inflator 22 blows out gas G1 via the discharge ports formed in its lower portion into the lower chamber 51. The lower chamber 51 is inflated by the gas G1 to intervene between the passenger's torso and the inner wall for the vehicle compartment.

Even while the lower chamber 51 is being deployed, the gas G1 continues to be blown from the discharge ports. Therefore, the mainstream of the gas G1 hits the inner surface of the air bag 50 in the vehicle front side of the lower chamber 28. The gas G1 is reflected by the inner surface of the air bag 50 and directed to the vehicle rear side of the lower chamber 51, while substantially completely inflating the lower chamber 51.

Figure 12C:
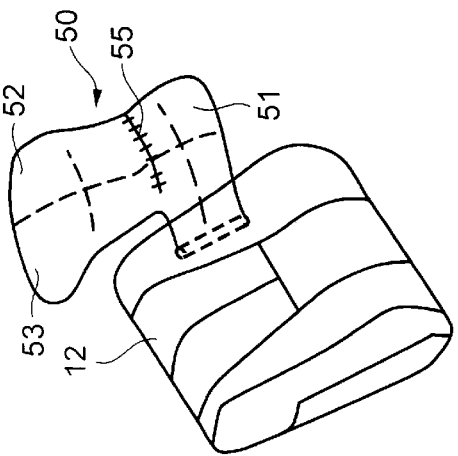

Gas G2 deflected to the vehicle rear side of the lower chamber 51 hits the inner surface of the vehicle rear side of the air bag 50. Since the lower chamber 51 is completely inflated, however, the gas G2 passes the communication hole 54. The gas G2, immediately before passing the communication hole 54, has a momentum to flow to the vehicle rear side of the air bag 50. Therefore, the gas G2 is reflected by the inner surface of the vehicle rear side of the air bag 50 while passing the communication hole 54. After having passed the communication hole 54, gas G3 is reflected by the inner surface of the vehicle rear side of the air bag 50. Subsequently, as shown in FIG. 12(c), the gas G3 is then directed toward the vehicle front side of the upper chamber 52.

Figure 11B:
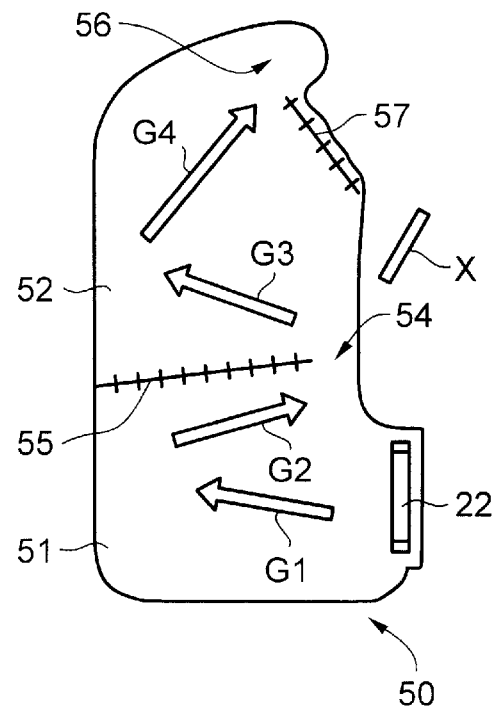
Figure 12D:
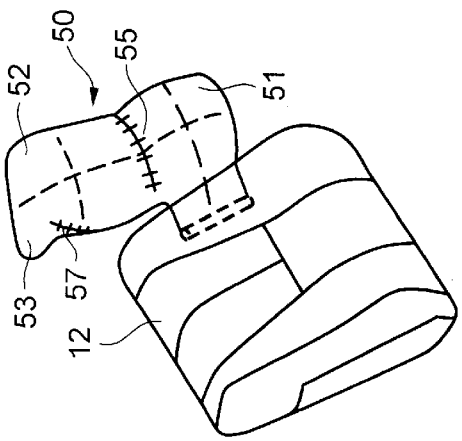

As shown in FIG. 11(b), the gas G3 flowing towards the vehicle front side of the upper chamber 52 is reflected by the inner surface of the vehicle front side of the upper chamber 52, before gas G4 flows toward the vehicle rear side of the upper chamber 52. The flow of gas G3, G4 causes the upper chamber 52 to be substantially completely inflated, as shown in FIG. 12(d).

A part of the gas G4 passes the communication hole 56 via the tear seam 57 and flows from the vehicle front side of the air bag 50 into the upper rear chamber 53, inflating and deploying a part of the upper rear chamber 53 toward the vehicle rear upper side. At this time, the upper part of the upper chamber 52 is deployed above the seat belt X, and a part of the upper rear chamber 53 turns above the seat belt X and deploys.

Figure 11C:
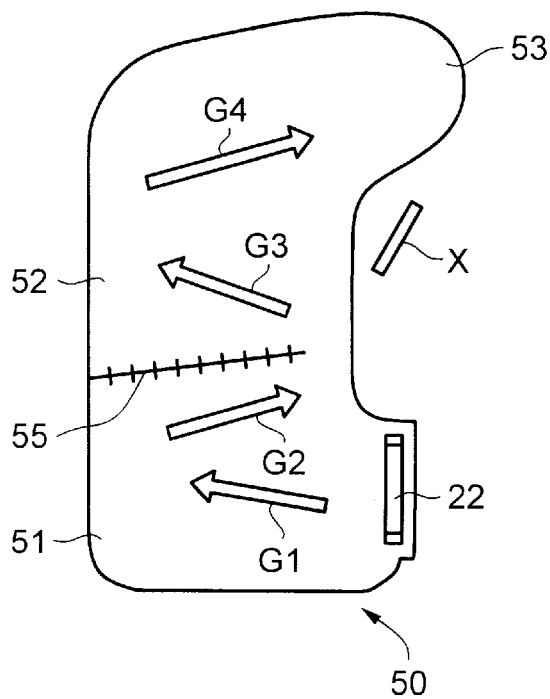
Figure 12E:
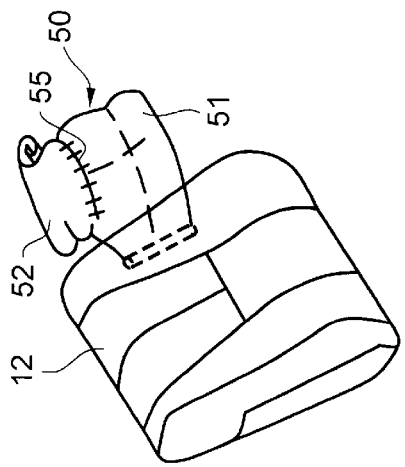

Thereafter, as shown in FIG. 11(c) and FIG. 12(e), the upper chamber 52 and a part of the upper rear chamber 53 are substantially completely deployed. When the internal pressure of the chambers 52 and 53 reaches a specified pressure, the tear seam 57 starts tearing from the side of the communication hole 56 due to the pressure. After the tear seam is entirely torn, the remaining part of the upper rear chamber 53 is deployed toward the vehicle rear side. The upper chamber 52 and the upper rear chamber 53 are combined into one, and the upper rear chamber 53 is substantially completely deployed. Since the remaining part of the upper rear chamber 53 is deployed avoiding, or deployed above the seat belt X, the seat belt X is prevented from obstructing deployment of the air bag 50.

In the second embodiment, the gas G blown from the inflator 22 is prevented by the seam 55 and the tear seam 57 from flowing directly into the upper rear chamber 53. The air bag 50 is securely inflated and deployed in order from the lower chamber 51, the upper chamber 52 to the upper rear chamber 53. Therefore, the air bag 50 being deployed is prevented from interfering with the seat belt X. Since the air bag 50 is completely deployed between the head of the passenger and the inner wall of the vehicle compartment without being obstructed by the seat belt X, the collision energy onto the head can be sufficiently absorbed and the secondary collision of the head of the passenger against the inner wall can be prevented.

The absorbing of the collision energy applied to the passenger when a side collision occurs is described. When a collision force is applied to a side of the vehicle, a collided vehicle side wall is deformed by the collision force and is moved toward the center of the vehicle compartment at an opposite side with respect to the point of collision. The collision force onto the vehicle side wall is detected by the sensor (not shown), which generates an operation command to the inflator 22. Gas is momentarily blown from the inflator 22 to the lower chamber 51, inflating and deploying the lower chamber 51 between the torso of the passenger and the inner wall of the vehicle compartment. Successively, the upper chamber 52 and a part of the upper rear chamber 53 are inflated and deployed between the head of the passenger and the inner wall of the vehicle compartment.

The upper half (mainly the torso and the shoulder) of the passenger is received by the lower chamber 51 and the upper chamber 52, which absorb the collision energy acting on the upper half of the passenger and securely prevent the secondary collision of the upper half of the passenger against the inner wall of the vehicle compartment. When the passenger is received by the lower chamber 51 and the upper chamber 52, the volume of the chambers 51 and 52 is reduced and the internal pressure thereof is temporarily increased. When the internal pressure of the upper chamber 52 increases, the tear seam 57 breaks, gas flows into the upper rear chamber 53, and the upper rear chamber 53 is inflated and deployed between the side of the passenger's head and the inner wall of the vehicle compartment.

The head of the passenger tends to remain where it is due to its inertia and, as a result, relatively approaches the vehicle side wall moving toward the center of the vehicle compartment. However, since the upper rear chamber 53 intervenes between the side of the passenger's head and the inner wall of the vehicle compartment, the head is received by the upper rear chamber 53, which absorbs the collision energy acting on the head and securely prevents the secondary collision of the head of the passenger against the inner wall of the vehicle compartment.

Figure 13B:
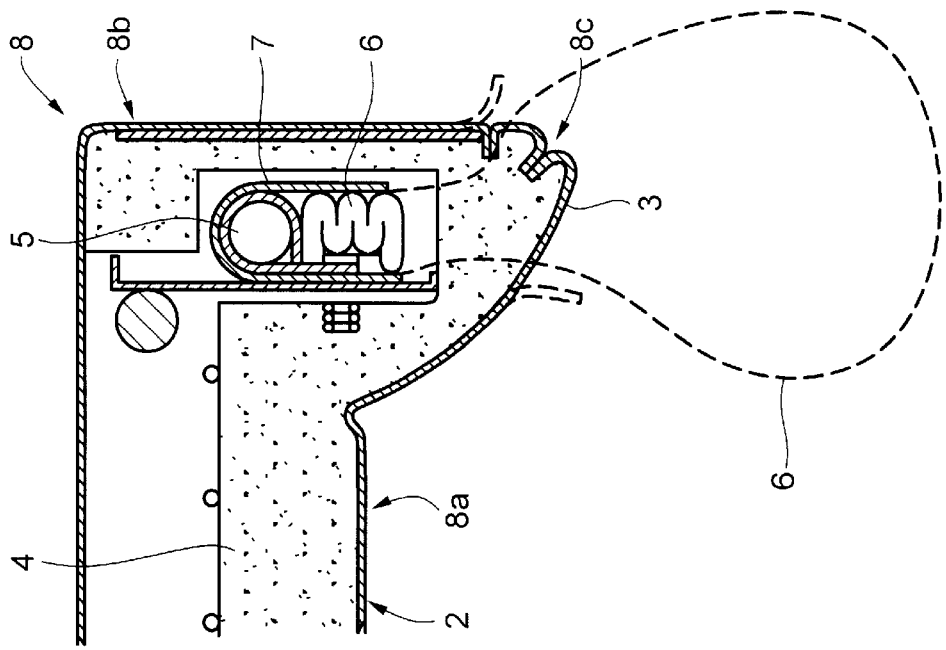
FIGS. 13(*a*) and 13(*b*) show a seat having a prior-art air bag system built therein.
Figure 13A:
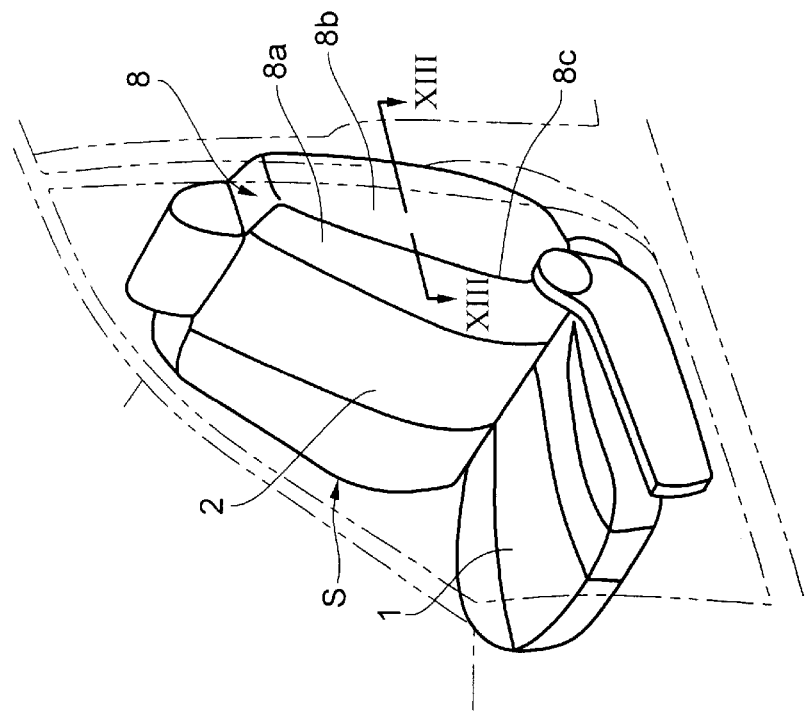
Figure 14:
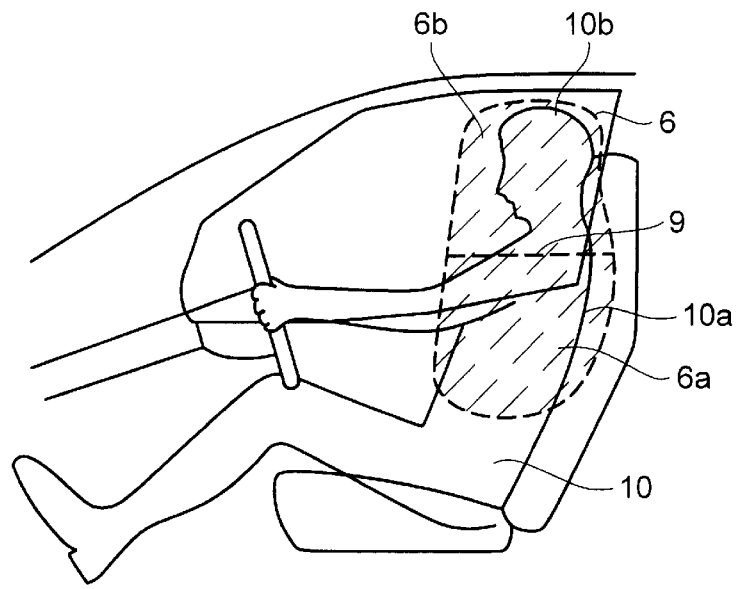
FIG. 14 is a diagrammatic representation showing a prior-art side impact air bag system.
Figure 15:
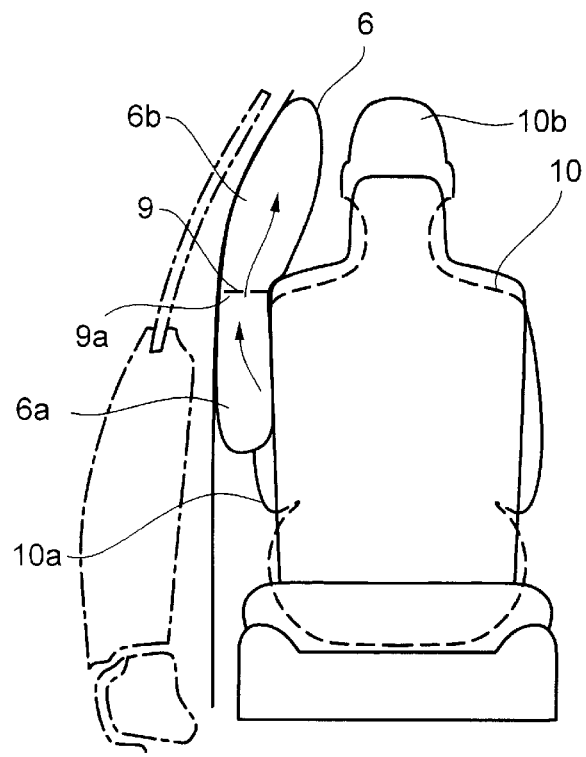
FIG. 15 is another diagrammatic representation showing the prior-art side impact air bag system.
Figure 16A:
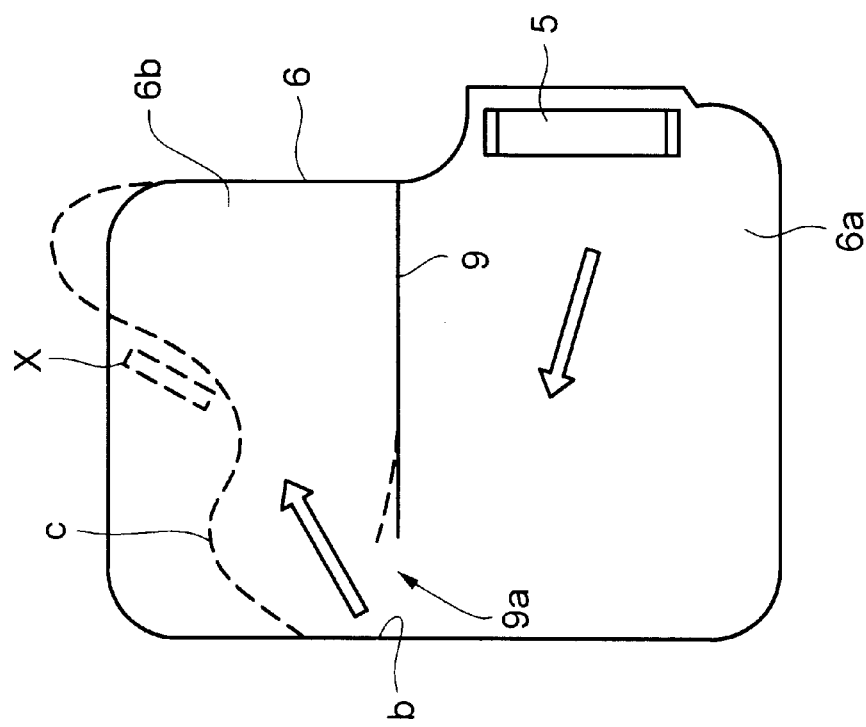
FIGS. 16(*a*) and 16(*b*) are longitudinal sectional side views of a prior-art air bag.
Figure 16B:
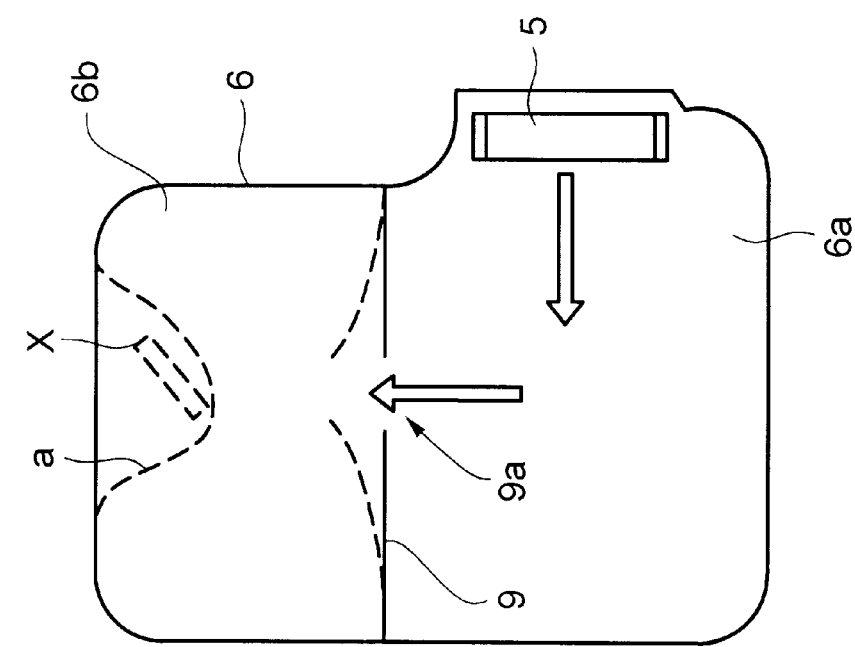

In the constitution according to the foregoing embodiments, the recess 19 are surrounded by the cushion material 15 provided inside the seat back 12. Inside the recess 19, the inflator 22 for generating nitrogen gas or the like and the air bag module 20 constituted of the air bag 25 in a deflated and folded condition are stored. The opening 18 is covered with the second cover member 30 for covering the rear side of the seat back 12. However, the constitution for containing the air bag module 20 is not restricted to the embodiments. For example, even when in the embodiments the conventional air bag module provided as shown in FIGS. 13(a) and 13(b) is used and the air bag is inflated as shown in FIG. 13, the resulting effect will be the same.

In the embodiments, the air bag system is installed in the seat back of the passenger's seat of the vehicle. By installing the air bag system in the seat back of driver side seat, the same effect can be obtained.

As aforementioned, according to the invention, when a side collision occurs, the torso of the passenger can be securely protected. Since the air bag is inflated to receive the head of the passenger without interfering with the seat belt fastened onto the passenger, the collision energy on the head of the passenger can be sufficiently absorbed. By providing, in the vehicle rear side of the air bag, a communication portion via which gas flows from the first chamber to the second chamber, the primary pressure of gas in the first chamber can be increased and the time necessary for inflating the first chamber for protecting the passenger's torso can be shortened. The collision energy acting on the passenger can be immediately absorbed accordingly.

The gas blown from the inflator can be prevented by the first and second separators from flowing directly into the third chamber. The air bag can be securely inflated and deployed in sequence of the first, second and third chambers. The air bag is deployed without interfering with the seat belt, and intervenes between the passenger and the inner wall of the vehicle compartment. Therefore, the collision energy acting on the passenger can be sufficiently absorbed and the secondary collision of the passenger against the inner wall of the vehicle compartment can be prevented. Especially, the collision energy on the head of the passenger can be securely absorbed and the secondary collision of the head of the passenger against the inner wall of the vehicle compartment can be prevented.

Further, the second separator is formed so feeble that it can be broken by the internal pressure of the air bag when the air bag is inflated and deployed. Therefore, the third chamber can be inflated and deployed in a desired direction.

What is claimed is:

1. A side impact air bag system comprising:
   a gas generating device attached to a vehicle seat, said gas generating device blowing gas toward a front side of said seat when a collision force applied to a side of a vehicle is detected; and
   a bag having a front side and a rear side and being connected to said gas generating device and deployed by said gas, said bag including:

a first chamber positioned between a torso of a passenger and a vehicle side part when deployed, the gas blown from said gas generating device flowing directly into said first chamber to deploy said first chamber;

a second chamber positioned between a head of the passenger and a vehicle side part when deployed, said gas flowing via said first chamber into said second chamber to deploy said second chamber; and a first separator extending along a front-to-rear direction of the seat when the bag is deployed for dividing said bag into said first chamber and said second chamber, wherein said first separator is positioned relative to the rear side of said bag such that a first communication passage is defined between the first separator and the rear side of the bag for connecting said first chamber and said second chamber and such that gas is communicated between the first and second chambers via the first communication passage only at the rear side of the bag while the bag inflates, and wherein said gas blown from said gas generating device to the seat front side is deflected to said first communication passage by an inner surface of the seat front side of said first chamber, and further deflected to the seat front side to deploy said second chamber by an inner surface of the seat rear side of said first communication passage when passing said first communication passage.

2. The side impact air bag system according to claim 1, wherein said gas flowing into said second chamber is further deflected to a seat rear upper part of said second chamber by an inner wall of the seat front side of said second chamber.

3. The side impact air bag system according to claim 1, wherein said first separator is a partitioning wall.

4. The side impact air bag system according to claim 1, wherein said first separator is a seam.

5. The side impact air bag system according to claim 1, wherein said bag includes a third chamber provided on the seat rear upper part of said second chamber.

6. The side impact air bag system according to claim 5, wherein said bag includes a second separator for separating said second chamber from said third chamber.

7. The side impact air bag system according to claim 6, wherein said second separator is positioned relative to a rear side of said bag such that a second communication passage is defined therebetween for connecting said second chamber and said third chamber.

8. The side impact air bag system according to claim 7, wherein said second separator is a seam.

9. The side impact air bag system according to claim 8, wherein said seam has a strength set lower at the side of said second communication passage than a strength at the seat rear side.

10. The side impact air bag system according to claim 6, wherein a strength of said second separator is set lower than a strength of said first separator.

11. The side impact air bag system according to claim 10, wherein the strength of said second separator is set such that said second separator is broken when said second chamber is deployed.

12. The side impact air bag system according to claim 11, wherein said first separator and said second separator are seams.

13. The side impact air bag system according to claim 1, wherein said second chamber receives gas from said gas generating device only through said first communication port.

14. The side impact air bag system of claim 1, wherein the rear side of the bag is located closer to the gas generating device than the front side of the bag.

15. A side impact air bag system comprising:

a gas generating device that blows gas toward a front side of said seat when a collision force applied to a side of a vehicle is detected; and a bag having a front side and a rear side and being connected to said gas generating device and deployed by said gas, said bag including:

a first chamber positioned between a torso of a passenger and a vehicle side part when deployed, the gas blown from said gas generating device flowing directly into said first chamber to deploy said first chamber, a second chamber positioned between a head of the passenger and a vehicle side part when deployed, said gas flowing via said first chamber into said second chamber to deploy said second chamber, and a first separator extending along a front-to-rear direction of the seat when the bag is deployed for dividing said bag into said first chamber and said second chamber, and a first communication passage connecting said first chamber and said second chamber and positioned such that gas is communicated between the first and second chambers via the first communication passage only at the rear side of the bag while the bag inflates, wherein said gas blown from said gas generating device to the front side of the seat is deflected to said first communication passage by an inner surface of the seat front side of said first chamber, and further deflected to the seat front side to deploy said second chamber by an inner surface of a seat rear side of said first communication passage when passing said first communication passage, and wherein said second chamber receives gas from said gas generating device only through said first communication passage.

16. The side impact air bag system according to claim 15, wherein an inner wall of a seat front side of said second chamber further deflects said gas flowing into said second chamber to a seat rear upper part of said second chamber.

17. The side impact air bag system according to claim 15, wherein said first separator is a seam.

18. The side impact air bag system according to claim 15, wherein said bag includes a third chamber provided on the seat rear upper part of said second chamber, and wherein said bag includes a second separator for separating said second chamber from said third chamber.

19. The side impact air bag system according to claim 18, wherein said second separator is positioned relative to said seat front side such that a second communication passage is defined therebetween for connecting said second chamber and said third chamber.

20. The side impact air bag system according to claim 19, wherein said second separator is a seam whose strength is lower at the side of said second communication passage than at the seat rear side.

21. The side impact air bag system according to claim 18, wherein a strength of said second separator is lower than a strength of said first separator.

22. The side impact air bag system according to claim 21, wherein the strength of said second separator is set such that said second separator is broken when said second chamber is deployed.

23. The side impact air bag system according to claim 22, wherein said first separator and said second separator are seams.

24. The side impact air bag system of claim 15, wherein the rear side of the bag is located closer to the gas generating device than the front side of the bag.

* * * * *